United States Patent [19]

Fujihira

[11] Patent Number: 5,101,598
[45] Date of Patent: Apr. 7, 1992

[54] STRUCTURE OF WEATHERSTRIP APPLICABLE TO VEHICLES OF SASH-LESS DOOR TYPE

[75] Inventor: Junichi Fujihira, Chiba, Japan

[73] Assignee: Kinugawa Rubber Industrial Co., Ltd., Chiba, Japan

[21] Appl. No.: 613,461

[22] Filed: Nov. 14, 1990

Related U.S. Application Data

[63] Continuation of Ser. No. 380,734, Jul. 17, 1989, abandoned, which is a continuation of Ser. No. 81,248, Aug. 4, 1987, abandoned.

[30] Foreign Application Priority Data

Aug. 5, 1986 [JP] Japan ............... 61-184023

[51] Int. Cl.⁵ ............................ E06B 7/16
[52] U.S. Cl. ............................ 49/498
[58] Field of Search ............ 49/489, 492, 498, 402

[56] References Cited

U.S. PATENT DOCUMENTS

| | | | |
|---|---|---|---|
| 2,935,771 | 5/1960 | Hatcher | 49/489 X |
| 2,969,252 | 1/1961 | Gruver | 49/489 X |
| 3,899,260 | 8/1975 | Kerschner | 49/498 X |
| 4,010,573 | 3/1977 | Andrzejewski | 49/498 X |
| 4,047,751 | 9/1977 | Koike | 49/498 X |
| 4,381,115 | 4/1983 | Ko | 49/498 X |
| 4,622,286 | 12/1962 | Beck | 49/498 X |
| 4,628,639 | 12/1986 | Lownsdale | 49/498 |
| 4,708,898 | 11/1987 | Gommier et al. | 49/498 X |

Primary Examiner—Joseph Falk
Attorney, Agent, or Firm—Foley & Lardner

[57] ABSTRACT

A water-tight structure of weatherstrip for a vehicle body of a sash-less door type, in which a guide portion substantially in an arcuate form of cross section is disposed within a hollow portion of the weatherstrip so as to oppose an inner surface of the lip portion. When a door glass is moved upward toward a predetermined uppermost position so as to close a passenger compartment, a peripheral edge of the door glass is face-to-face contacted with the lip portion under pressure so that the lip portion is pressed against and supported on the guide portion. Thus, a sufficient water-tight structure can be achieved.

10 Claims, 3 Drawing Sheets

STRUCTURE OF WEATHERSTRIP APPLICABLE TO VEHICLES OF SASH-LESS DOOR TYPE

This application is a continuation of application Ser. No. 07/830,734, filed July 17, 1989, now abandoned, which is a continuation of application Ser. No. 07/081,248, filed Aug. 4, 1987, now abandoned.

BACKGROUND OF THE INVENTION

The present invention relates to a structure of weatherstrip used for sealing a passenger compartment of a vehicle. Such weatherstrips are attached to opening edges of vehicle bodies.

A Japanese Patent Application First Publication (Tokkai) Sho 59-106320 exemplifies such structures for weatherstrips applicable to such vehicles of sash-less door type.

In the above-identified Japanese Patent Application First Publication, a retainer is mounted on an opening edge of a vehicle body, e.g., a door opening portion thereof. A weatherstrip is partially fitted to the retainer. The weatherstrip includes a base portion disposed within the retainer, a supporting pole portion integrally and vertically extended from the base portion, and a hollow lip portion extended between a lower end of the supporting pole portion and one end of the base portion which is located outside of the passenger compartment. When a door glass is moved upward to close the passenger compartment, the hollow lip portion is brought in close contact with an upper edge of the door glass so that the sealing between the inside and outside of the passenger compartment can be achieved.

However, since in the structure of the weatherstrip the hollow lip portion and upper edge of the door glass are closely contacted with each other only through a reaction force of the hollow lip portion, the weatherstrip does not always achieve the sealing reaction force. In addition, since the door glass upper edge is linearly contacted with the hollow lip, water may invade the inside of the passenger compartment even when vehicle door windows are closed. To cope with such unfavorable structures, a stay in substantially a letter-L shaped cross section, one end thereof being fixed to the base portion and the other end thereof being fixed to an inner side surface of the hollow lip portion, is formed. The stay supports the hollow lip portion and serves to increase the sealing reaction force of the hollow lip portion.

However, when the above-described structure having the stay in the hollow lip portion is applicable to the vehicle of the sash-less door type, some drawbacks occur. That is to say, when the vehicle door is closed with the door glass moved downward and then the door glass is moved upward to close the passenger compartment, the upper side edge of the door glass is approximately contacted with a lowest end of the hollow lip portion. Then, the upper side edge thereof is further moved upward and displaced toward the outside of the passenger compartment, with the hollow lip portion deformed and flexed toward the inner hollow part of the hollow lip portion.

At this time, since one end of the stay is fixed to an intermediate edge of the hollow lip portion, the further upward movement of the door glass is blocked before the door glass completely reaches its uppermost position. Consequently, no face-to-face contact state between the door glass and hollow lip portion can be achieved but only the upper side edge of the door glass is brought in contact with the hollow lip portion. Therefore, water may similarly invade the passenger compartment since a water-tight sealing characteristic cannot sufficiently be achieved.

SUMMARY OF THE INVENTION

It is an object of the present invention to provide a water-tight structure of weatherstrip for a vehicle which can achieve a sufficient water-tight structure in a face-to-face contact state between a door window and weatherstrip.

It is another object of the present invention to provide the water-tight structure of the weatherstrip which can prevent water from invading the inside of a passenger compartment when the door glass is moved upward to an uppermost position to close the passenger compartment with a corresponding vehicle door closed.

These objects can be achieved by providing a structure comprising: (a) a retainer disposed along an opening edge of a body of an object; (b) a closure member movable toward the retainer for closing an inner side of the body; and (c) elastic means disposed within the retainer and which is brought in close contact with a peripheral edge of the closure member under pressure so as to be in face-to-face contact with the peripheral edge of the closure member.

These objects can also be achieved by providing a structure of a weatherstrip for a vehicle body, comprising: (a) a base portion disposed within a retainer disposed along an opening edge of a vehicle body; (b) a hollow portion; (c) a lip portion defining the hollow portion and disposed outside of the retainer in an outer direction of a passenger compartment; and (d) a guide portion disposed within the hollow portion so as to oppose an inner side surface of the lip portion substantially in an arcuate form of cross section bent toward the lip portion.

BRIEF DESCRIPTION OF THE DRAWINGS

A more complete understanding of the present invention may be obtained from the attached drawings in which like reference numerals designate corresponding elements and in which.

DETAILED DESCRIPTION OF THE PREFERRED EMBODIMENTS

Reference will hereinafter be made to the drawings in order to facilitate understanding of the present invention.

Figure 1:
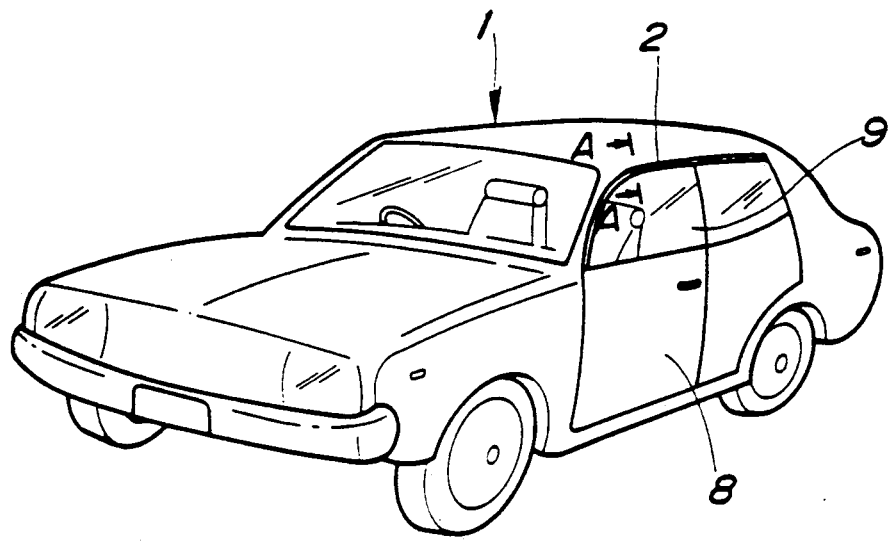
FIG. 1 is a simplified perspective view of a vehicle of a sash-less door type to which the present invention is applicable.

FIG. 1 shows a vehicle of a sash-less door type to which the present invention is applicable.

As shown in FIG. 1, along an opening edge 2 of a vehicle body 1 is disposed a retainer 3. A weatherstrip 12 according to the present invention is fitted to the retainer 3.

Figure 2:
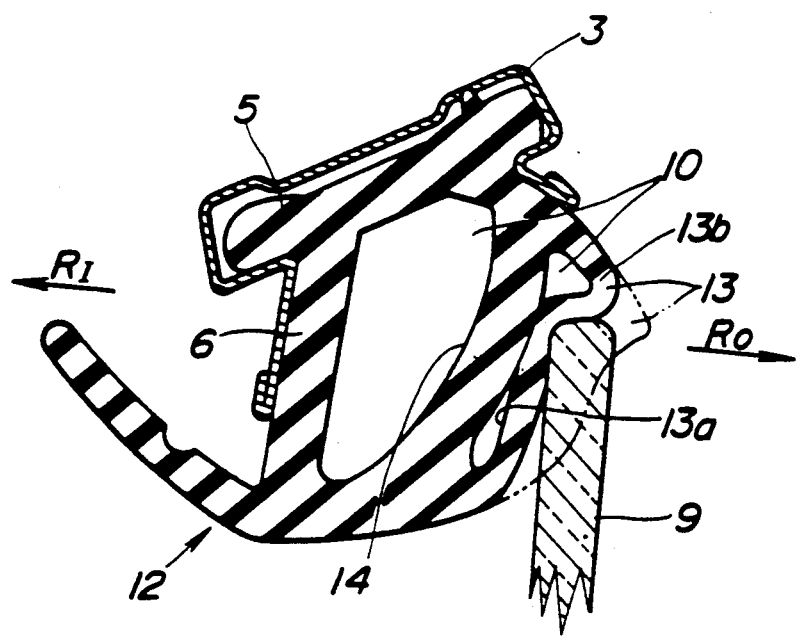
FIG. 2 is a cross sectional view of a structure of a weatherstrip and its surroundings in a first preferred embodiment cut away along a line A—A of FIG. 1.
Figure 3:
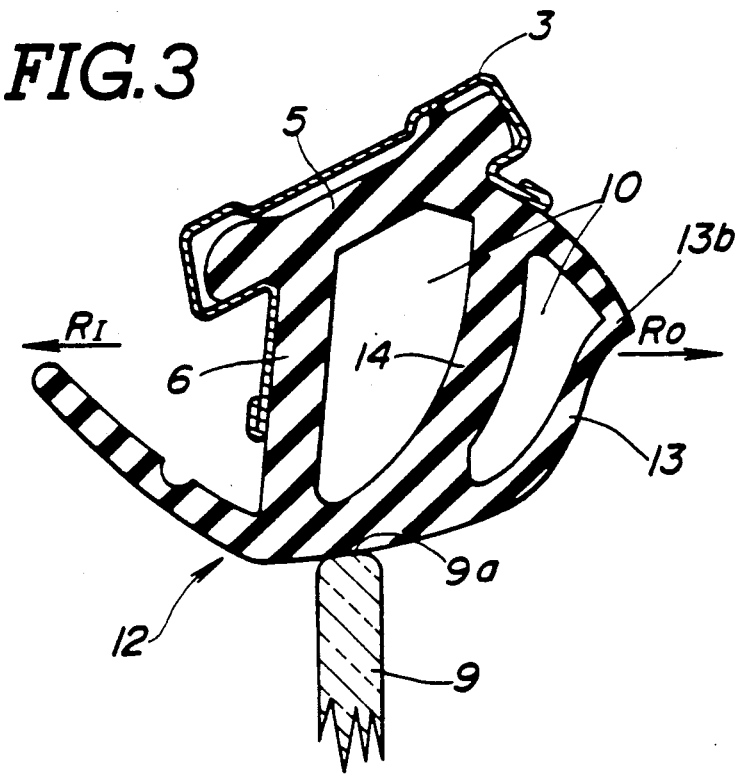
FIG. 3 is a cross sectional view as shown in FIG. 2.
Figure 4:
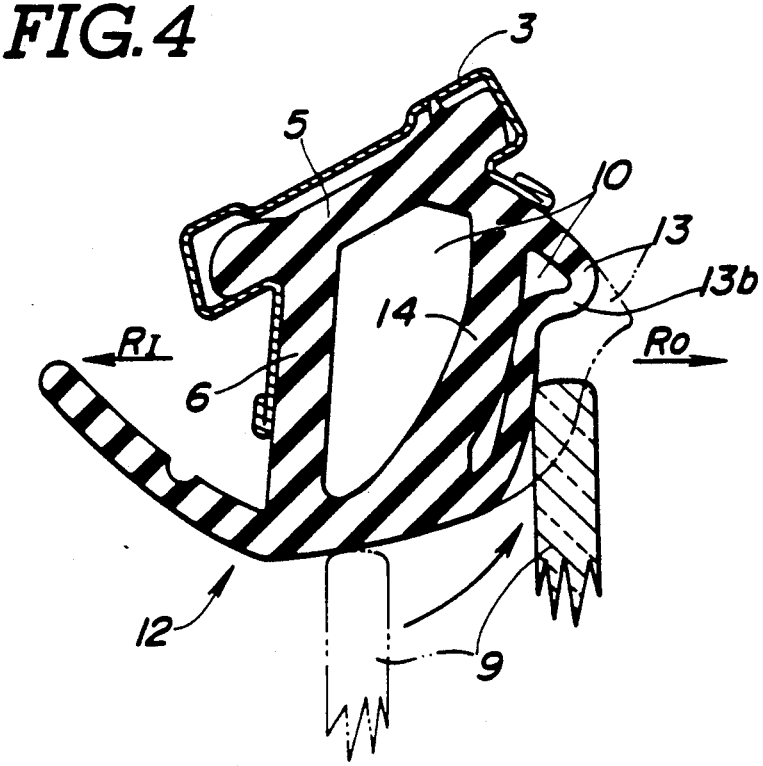
FIG. 4 is a cross sectional view as shown in FIG. 3.

FIGS. 2, 3, and 4 show a first preferred embodiment of a weatherstrip structure according to the present invention.

The weatherstrip 12 in the first preferred embodiment includes a base portion 5 disposed within the retainer 3, a supporting pole portion 6 vertically extended from the base portion 5 toward the inside $R_I$ of a passenger compartment, a hollow lip portion 13 substantially in a radially expanded form extended between the lower end of the supporting pole portion 6 and a terminal of the base portion 5 at an outside of the passenger compartment $R_o$. A guide portion 14, in addition, is integrally formed from one end of the base portion 5 toward an intermediate portion of the hollow lip portion 13. The guide portion 14 is disposed within a space defined by the hollow lip portion 13, base portion 5, and supporting pole portion 6. The guide portion 14, furthermore, opposes an inner side surface 13a of the hollow lip portion 13 and is slightly bent in an arcuate form toward the outside $R_o$ of the passenger compartment. A projected portion 13b is formed on an outer part of the hollow lip portion 13. It is noted that the projected portion 13b and a lower surrounding of the projected portion 13b are face-to-face contacted with an upper tip of the door glass 9.

In the first preferred embodiment, when the door 8 is closed with the door glass 9 moved to its uppermost position, the inner side peripheral surface of the door glass 9 is contacted with the hollow lip portion 13 as shown in FIG. 2. Thus, the hollow lip portion 13 is flexed toward the inner side of the hollow lip portion 10. At this time, since the guide portion 14 which opposes the inner surface 13a of the hollow lip portion 13 is formed, the hollow lip portion 13 is pressed against and supported on the guide portion 14. The hollow lip 13 can, thus, provide a sufficient reaction force of sealing. The hollow lip portion 13 can face-to-face be contacted with the inner side peripheral surface and the upper edge of the door glass 9. Consequently, invasion of water into the compartment can sufficiently be blocked.

On the other hand, in a case where the door 8 is closed with the door glass 9 moved downward and then the door glass 9 is, in turn, moved upward, the upper edge 9a of the door glass 9 is first contacted with a lower end of the hollow lip portion 13, as shown in FIG. 3. Therefore, as shown in FIG. 4, the hollow lip portion 13 is flexed toward the hollow space 10 and the upper edge 9a is further moved upward, displacing in an arrow-marked direction of the outside $R_o$ of the passenger compartment.

Since, at this time, the guide portion 14 is bent in the arcuate form, the hollow lip portion 13 takes an arcuate form substantially along the guide portion 14 when it is flexed. Therefore, the door glass 9 can smoothly be moved upward to a predetermined position along the side surface of the outside $R_o$ of the passenger compartment of the hollow lip portion 13 flexed and deformed substantially in an arcuate form. The upper end of the door glass 9 can be contacted with the projected portion 13a of the hollow lip portion 13.

In the same way as the door closed with the door glass 9 placed at the uppermost position shown in FIG. 2, the hollow lip portion 13 is face-to-face contacted with the inner side peripheral surface and the upper edge of the door glass 9.

Figure 5:
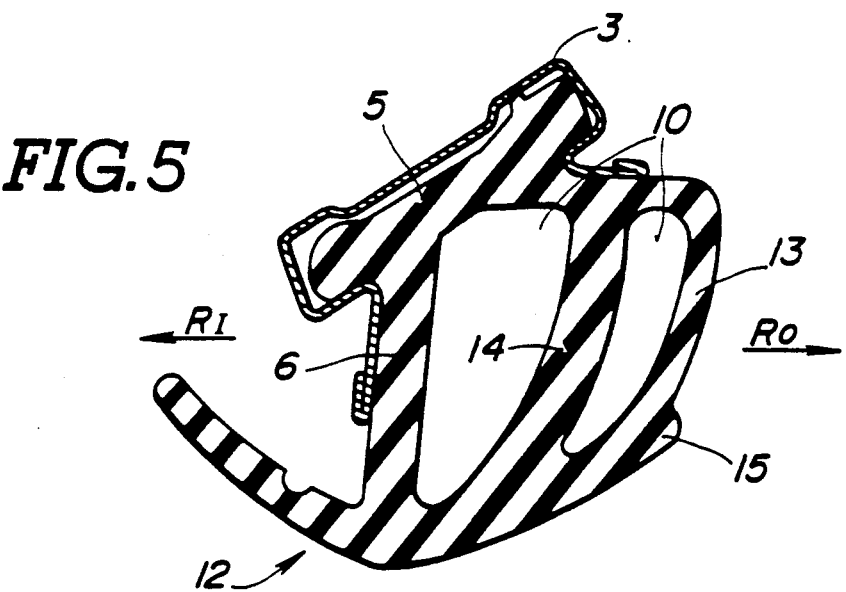
FIG. 5 is a cross-sectional view of the structure of another weatherstrip and its surroundings in a second preferred embodiment cut away along the line A—A of FIG. 1.
Figure 6:
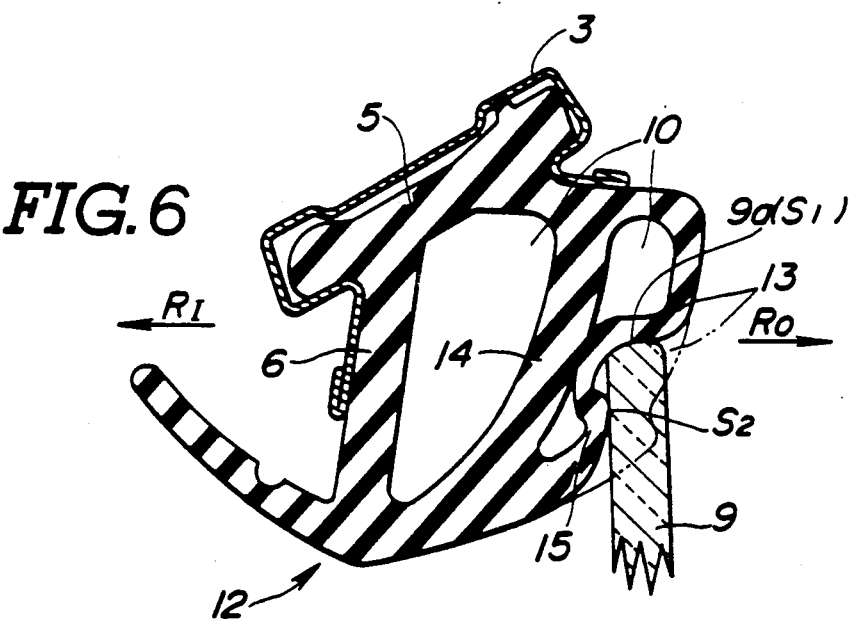
FIG. 6 is a cross sectional view as shown in FIG. 5.

FIGS. 5 and 6 show a second preferred embodiment.

In the second preferred embodiment, a tongue portion 15 is formed substantially at the center portion of the side surface outside $R_o$ of the passenger compartment of the hollow lip portion 14.

Figure 7:
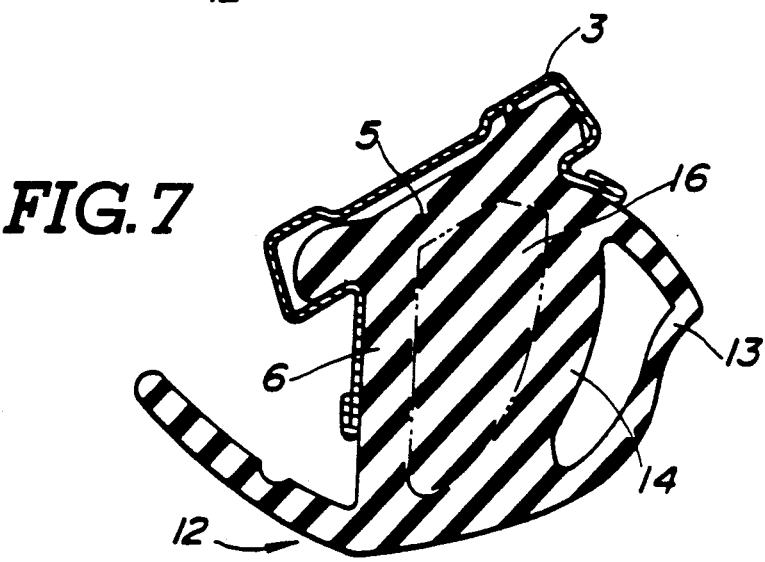
FIG. 7 is a cross sectional view of the structure of still another weatherstrip and its surroundings in a third preferred embodiment cut away above the line A—A of FIG. 1.

In the second preferred embodiment, a contact surface $S_1$ is present between the upper edge 9a of the door glass 9 and general surface of the hollow lip portion 13 and a contacting surface $S_2$ is present between the inner side peripheral surface of the door glass 9 and tongue portion 15. Therefore, the sufficient water-tight structure with the two contacting surfaces $S_1$ and $S_2$ can be achieved FIG. 7 shows a third preferred embodiment.

In the first and second preferred embodiments, the hollow portion 10 is present at both sides of the guide portion 14. In the third preferred embodiment shown in FIG. 7, on the other hand, a body portion 16 is integrally formed between the guide portion 14 and supporting pole portion 6. The cross-sectional structure of the weatherstrip can be simplified with the required effect achievable.

As described hereinabove, since in the o structure of weatherstrip applicable to the opening edge of the vehicle of the sash-less door type, the hollow lip portion is face-to-face contacted with the peripheral surfaces of the door glass when the door is closed with the door glass moved downward and then the door glass is moved upward to the predetermined uppermost position. Therefore, a favorable water-tight structure of the weatherstrip can be achieved.

It will clearly be appreciated by those skilled in the art that the foregoing description is made in terms of the preferred embodiments and various changes and modifications may be made without departing from the scope of the present invention which is to be defined by the appended claims.

What is claimed is:

1. A structure for a vehicle body, comprising:
   (a) a retainer disposed along an opening edge of the vehicle body;
   (b) a closure member movable toward the retainer for closing an inner side of the vehicle body; and
   (c) elastic means which is disposed within the retainer and which is brought in close contact with an inner side peripheral surface and an upper edge of the closure member under pressure so as to be in a face-to-face contact with an inner side peripheral surface and an upper edge of the closure member, the elastic means including
   a base portion retained by the retainer,
   a supporting pole portion which is generally linear over its entire length, which extends substantially vertically from a first end of the base portion, and which is located at an inner side of a vehicle compartment,
   an integral guide portion having an outer surface which extends vertically from a second end of the base portion located at an outer side of the vehicle compartment to a lower end of the supporting pole portion and which is bent over substantially its entire length in a convex manner toward the outer side of the vehicle compartment in a substantially arcuate form, and a hollow lip portion integrally extending along an outer surface of the guide portion from an upper end of the guide portion which is located at the retainer to an intermediate surface of the guide portion, so that an inner surface of the hollow lip portion is pressed against the outer surface of the guide portion when the closure member is moved towards the retainer with the inner side peripheral surface and the upper edge of the closure member pressed against an outer surface of the hollow lip portion.

2. The structure as set forth in claim 1, wherein the elastic means further comprises a tongue portion disposed between the lower ends of the guide portion and lip portion and being projected toward the outer side of the vehicle compartment so that the peripheral edge of the closure member is contacted with the tongue portion and an upper edge thereof is contacted with the outside of the lip portion with the closure member placed at the retainer.

3. A weatherstrip structure for sealing a window in a vehicle body, comprising:
   (a) a base portion positioned within a retainer disposed along an opening in the vehicle body;
   (b) first and second hollow portions defined within said weatherstrip;
   (c) a lip portion adjacent the first hollow portion and disposed outside of the retainer;
   (d) a supporting pole portion which is disposed between said base portion and said lip portion and which extends substantially vertically from said base portion, said supporting pole portion being generally linear over its entire length; and
   (d) a guide portion which is disposed between the first and second hollow portions, which extends from said base portion to a lower end of said pole portion, and which has an outer surface which is bent in a substantially arcuate form over substantially its entire length toward said lip portion in a convex manner, whereby said lip portion is flexed into contact with the outer side of said guide portion in response to the window engaging said lip portion.

4. The structure as set forth in claim 3, which further comprises a tongue portion disposed between corresponding ends of the guide portion and lip portion, the tongue portion being contactable with a peripheral edge of said window.

5. The structure as set forth in claim 4, wherein the lip portion is contactable with said peripheral edge of said window.

6. The structure as set forth in claim 3, wherein said second hollow portion is provided between the supporting pole portion and the guide portion.

7. The structure as set forth in claim 3, wherein the supporting pole portion is integrally formed with the guide portion.

8. A sealing structure for a window of a vehicle body, comprising:
   a retainer disposed along an opening edge of the vehicle body; and
   a weatherstrip disposed in the retainer, the weatherstrip having a plurality of portions including a base portion and first, second, and third adjacent portions extending substantially in the same relative direction, said first, second, and third portions each connected to others of the portions and defining, along with the other portions, a pair of separate, elongated cavities of substantially equal length, said first portion extending substantially vertically from said base portion being generally linear over its entire length, an inner side of said third portion being flexed into contact with an outer side of said second portion in response to said vehicle window engaging said third portion, an outer side of said second portion being formed in a substantially arcuate, convex form towards said inner side of said third portion along substantially its entire length, said second portion extending from said base portion to a lower end of said first portion.

9. In an automobile body, a sealing structure for a window as defined in claim 8.

10. A weatherstrip structure for sealing a window in a vehicle body, comprising:
   (a) a base portion which is disposed within a retainer extending generally horizontally along an opening in the vehicle body;
   (b) a pole portion which is generally linear throughout its entire length and which extends substantially vertically from a first end of the base portion which is located at an inner side of a vehicle compartment,
   (c) a guide portion having an outer surface which extends vertically from a second end of the base portion located at an outer side of the vehicle compartment to a lower end of the supporting pole portion and which is bent in a convex direction toward the outer side of the vehicle compartment in a substantially arcuate form over substantially its entire length; and
   (d) a hollow lip portion integrally extending along an outer surface of the guide portion from an upper end of said guide portion which is located at the retainer to an intermediate surface of the guide portion.

* * * * *